INVENTOR:
LAD L. HERCIK
BY Norman Eisele
ATTORNEY.

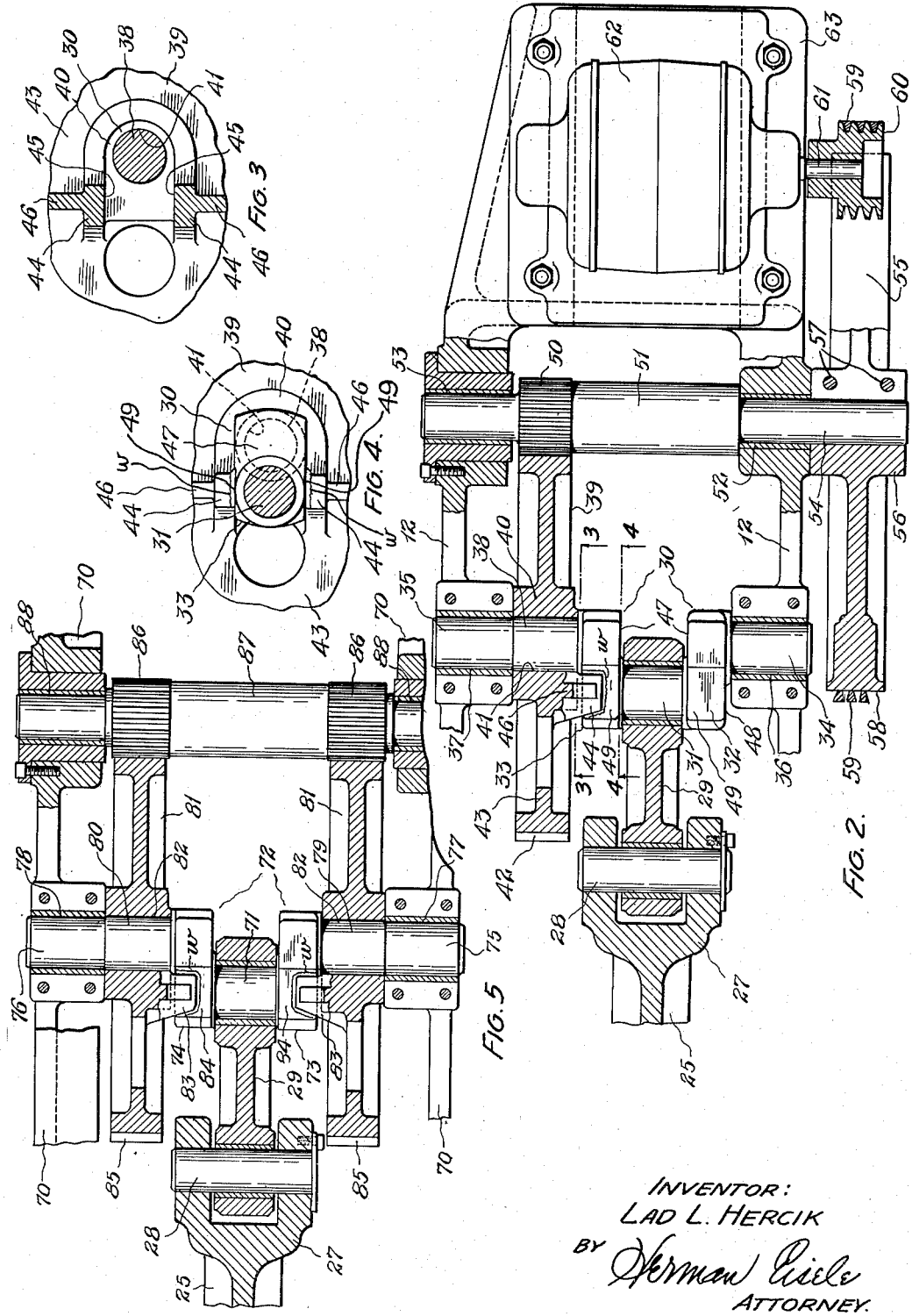

April 22, 1952 L. L. HERCIK 2,593,882
CRANK DRIVING MECHANISM
Filed Jan. 15, 1949 3 Sheets-Sheet 3

INVENTOR:
LAD L. HERCIK
BY
Herman Eisele
ATTORNEY.

Patented Apr. 22, 1952

2,593,882

UNITED STATES PATENT OFFICE 2,593,882

CRANK DRIVING MECHANISM

Lad L. Hercik, Lakewood, Ohio

Application January 15, 1949, Serial No. 71,065

8 Claims. (Cl. 287—52)

This invention relates generally to improvements in machinery for converting rotary motion into oscillating or reciprocating motion.

More particularly, this invention relates to improvements in mechanisms for driving cranks and equivalent elements used in machinery for producing oscillatory or reciprocating motion and which are directly actuated by a rotating member. The present improvement is particularly advantageous when embodied in mechanisms in which the resistance imposed on the driven crank is subject to extreme variation in intensity during its rotating cycle.

Among the types of machines in which the oscillated or reciprocated member imposes variation in intensity of resistance upon the crank member are punch presses, shearing machines, bolt headers and the like.

Heretofore, in machines of this type, and particularly in heavier machines, crank shafts formed with one or more journal portions, a crank pin and single or double crank arm, have usually been mounted in one or two bearings in a supporting frame, and have had a portion or portions of the crank shaft projecting beyond one or both bearings, on which projections, heavy rotating gears or flywheel-actuated clutch hubs have been mounted. These gears or clutch hubs have usually been rotatably fixed to the shaft by means of a key or keys seated in registering keyways in the shaft and in the bore of the gears or hubs.

In drives of this kind the crank pin is frequently required, in one part of its cycle, to overcome an extremely heavy and suddenly applied resistance, and in other applications the heavy resistance to the crank pin frequently changes instantaneously from a resistance to a pull, as, for instance, in a punch press or shear. This suddenly applied and/or reversing load is especially severe on keys which effect the driving relation between the crank and driving member. These sudden applications of or changes in load intensity on the crank are the equivalent of successive pounding or hammering on the keys or in some machines are the equivalent of an alternate reversal of direction of the application of pounding or hammering. This successive and/or alternate pounding causes a progressive and severe wearing on the keys and keyways in the shaft, and soon results in incipient loose play or backlash which progressively accelerates the wear and eventually produces impairment of the proper functioning of the crank.

Many attempts have been made to cure the difficulty pointed out by improving the driving connection between the gear and the shaft but no improvement has been found which insures certain and permanent freedom from the aforementioned difficulty in severe applications.

It also frequently happens, in the above described conventional drive, that a fracture occurs in the cylindrical part of the crank shaft at a point between the keyed hub of the driving member and the adjacent crank arm as a result of the heavy repeated stresses imposed on and transmitted by the shaft part to the crank.

It is accordingly a prime object of this invention to produce a drive connection between a driving member and a crank which will provide as direct a connection as possible between driving and driven parts and which will be rigid when initially assembled and which will permanently preclude the development of loose play between the driving member and the crank.

It is a further and more specific object of this invention to eliminate the need for a key or other equivalent third element between the driving member and the crank.

It is a further object of this invention to provide a crank driving mechanism in which the crank driving force is applied directly to the crank arm preferably at a point closely adjacent to the crank pin and in which no crank driving force is transmitted thru the shaft or journal portion of crank shaft.

It is a further and ancillary object of this invention to develop a crank drive in which the absence of torsion in the crank shaft will permit a reduction of the crank shaft diameter and crank shaft bearings.

It is a further object of this invention to provide a crank driving mechanism in which the intensity of pressure per unit of area on the parts in actual driving engagement can be reduced to a small fraction of the intensities of driving pressure heretofore generally encountered in drives of this type.

It is a further object of this invention to provide for the production of a rotary drive member and a crank shaft each separately by conventional methods, and to make possible the assembling of this drive member and crank shaft into an integral structure capable of acting as a unitary member.

It is a further object of this invention to develop a connection between separate driving member and driven crank which is integral and which is also readily disconnectable with modern machine shop facilities when either driving member or driven crank requires replacement or servicing.

A further understanding of the construction and operation and of the manner in which the novel features of this invention effect the above and further objects will become apparent from the following detailed description and the annexed drawings which set forth certain means embodying this invention, such disclosed means constituting, however, but two of the forms in which the principle of this invention may be applied.

The means in which this invention is embodied for purposes of disclosure is a shearing machine of the alligator type, in which the advantages of the present improvement have signally demonstrated their worth.

Referring to the annexed drawings:

Fig. 2 is a developed sectional view generally in plan, taken on a broken plane indicated by the broken line 2, 2, in Fig. 1 and showing the elements and associated parts of the crank shaft drive comprising this invention.

Fig. 3 is a fragmentary vertical sectional view taken on the plane indicated by line 3, 3 in Fig. 2.

Fig. 4 is a fragmentary vertical sectional view taken on the plane indicated by line 4, 4 in Fig. 2.

Fig. 5 is a view similar to Fig. 2 showing, however, a modified form of this invention in which a plurality of certain novel features of this invention are embodied in one crank shaft drive.

Figure 1:
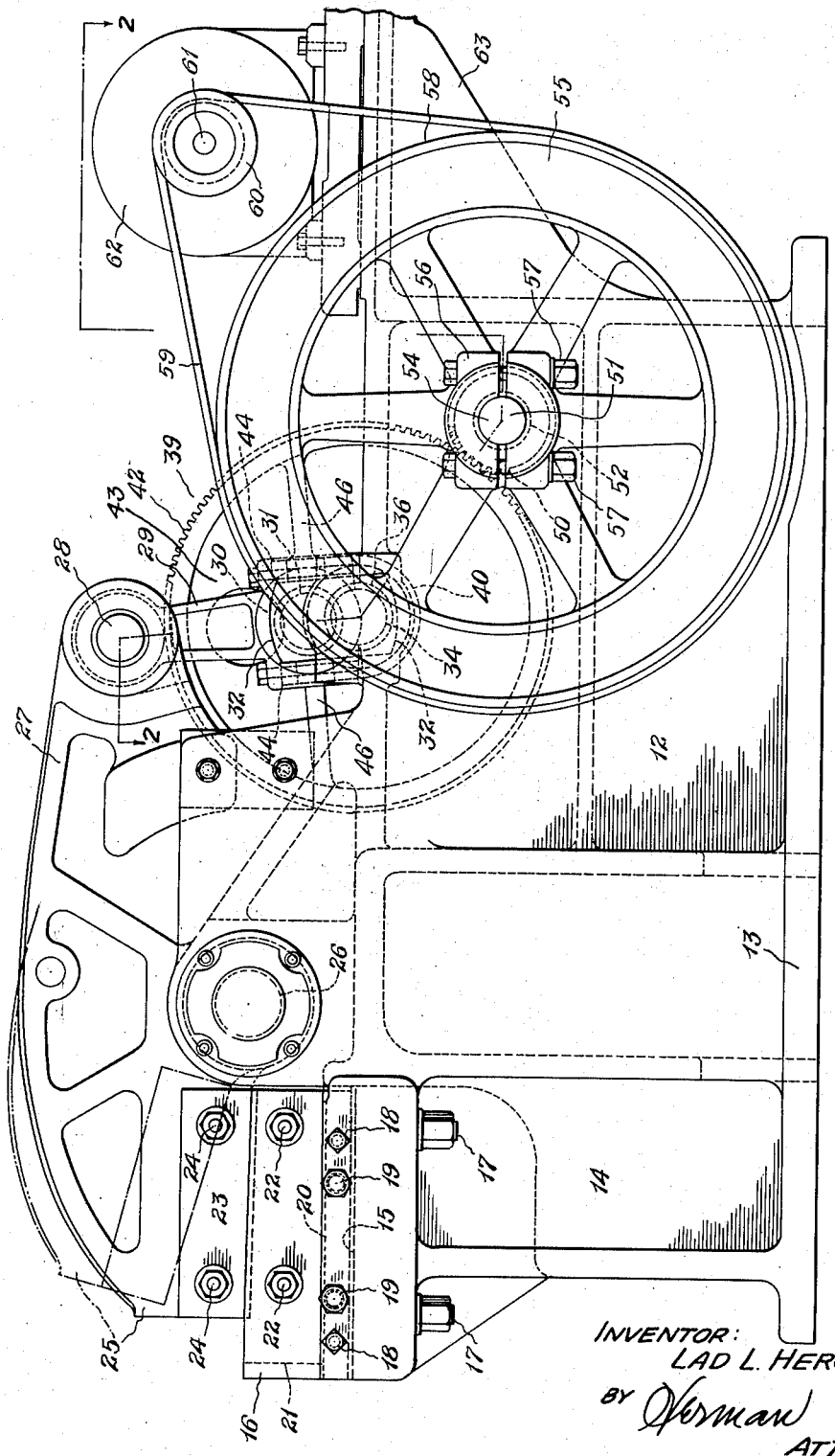
Fig. 1 is a side elevational view of an alligator shear embodying this invention, the shear arm of this shear being shown in full lines with its forward or cutting end in closed position, this forward end being also shown in broken lines in open position.

As shown in the drawings and particularly in Figures 1 to 4 and 6 to 11 thereof, the alligator shear in which this invention is embodied comprises a heavy elongated frame or bed 12 suitably braced with ribs and formed with a flanged base portion 13 adapted to rest on a suitable foundation or support. A forward portion 14 of the frame 12 is formed with a flanged seat 15 for the reception of a blade mount 16 held in position downwardly against the seat by screw means 17 and adapted to be laterally adjusted by screw means 18 and 19.

The blade mount 16 is provided with a seat 20 upon which a stationary shear blade 21 is held in position by bolt members 22.

Cooperable with the stationary shear blade 21 is a movable blade 23 fixedly secured by bolts 24 to a lever or shear arm 25.

The above described shear blade mounting and method of adjustment and the method of providing satisfactory shearing clearances between the shear blades 21 and 23 may be of any desired construction such, for instance, as shown in my Patents Nos. 2,440,799 and 2,370,311 or my co-pending application Serial No. 768,657.

The movable shear arm 25 is mounted for oscillation relatively to the frame 12 upon the axis of a king pin 26. The mounting of the shear arm on the king pin and the mounting of the king pin 26 in the frame 12 may be of any desired construction. I prefer, however, to use the construction and mounting of king pin fully disclosed in my Patent No. 2,370,311 above referred to.

The shear arm 25 has a preferably integrally formed rearwardly disposed extension 27, the rear end of which is operatively connected by means of a wrist pin 28, with one end of a pitman or connecting rod 29, the opposite end of the connecting rod having a pivotable connection with a crank pin 31 forming a part of a crank shaft indicated in its entirety at 30.

The crank shaft 30 as best appears in Figures 2, 3, 4, 6, 7, and 10 is formed with axially alined, and substantially parallel crank arms 32 and 33, and cylindrical extensions or journals 34 and 35 axially alined with each other. The crank pin 31, as will appear, is interposed between the crank arms and is parallel to and eccentrically disposed with respect to the journals 34 and 35. The journal 34 is located at one end of the crank shaft and is disposed adjacent to the crank arm 32 and the journal 35 is located at the other end of the crank shaft in the same axial direction as the crank arm 33 but spaced therefrom. The journals 34 and 35 are adapted to be mounted in bearings 36 and 37 respectively, in the main frame 12.

Interposed between the arm 33 and the journal 35 and axially alined with the journal 35 is a preferably cylindrical crank shaft portion 38 adapted to support a driving member 39 to be presently described.

The driving member 39 in the embodiment disclosed, as best appears in Figures 2, 3, 4, 8, 9, and 11, consists of a spur gear provided with a hub 40 which is in turn formed with a bore 41, this bore being preferably machined for a tight force fit on the cylindrical portion 38 of the crank shaft. This gear is formed with teeth 42 on its peripheral rim which is integrally connected with the hub by means of a web 43. Preferably integrally connected with hub 40 and web 43 and symmetrically spaced about a radial line and disposed a substantial distance from the axis and bore of the gear are a pair of ears 44, 44 formed with bearing surfaces 45, 45 facing each other, as most clearly appears in Figures 8 and 9. These ears are rigidly supported by means of brackets or ribs 46 integrally formed with the ears, web and rim of the gear. Thus, the ears 44 with their surfaces 45, provide the driving member 39 with opposed parallel flat shoulders of such extended contact area as will amply withstand any stresses or strains imposed thereon.

The crank arms 32 and 33 are formed with generally parallel end surfaces facing inwardly toward the crank pin 31 and substantially square with the axis of the crank pin 31 and journals 34, 35, and indicated at 47, 47 in the drawings. These crank arms are also formed with opposite end surfaces facing outwardly from the crank pin and toward the journal portions of the crank shaft, these surfaces also being generally parallel to each other and square with the axis of the crank pin and journals and being indicated at 48, 48.

The crank arms 32 and 33 are also formed with side surfaces or faces indicated at 49, 49, these side faces being preferably parallel to each other and parallel to the axis of the crank pin 31 and to the axes of the journals 34 and 35 and likewise parallel to a plane passing thru the axis of the crank pin 31 and journals 34 and 35, and equally spaced therefrom. These faces 49, 49 may accordingly be said to straddle the plane passing thru the crank pin and journals since they are arranged at opposite sides thereof. The faces 49 extend radially from a line intermediate the axes of the journals and of the crank pin to a line radially beyond the axis of the crank pin as clearly appears in Figures 6, 7, and 10.

The peripheral teeth 42 on the spur gear 39 are engaged by and adapted to be rotated by an alined spur pinion 50, rotatably fixed to a driven countershaft 51, Figures 1 and 2. This countershaft 51 is rotatably mounted in suitable bearings 52 and 53 and axially fixed thereby relatively to the frame 12, one end portion 54 of the shaft 51 extending beyond its bearing 52 and carrying a large and relatively very heavy pulley or flywheel 55, the hub 56 of which is split and adapted to be rotatably fixed to the shaft by means of clamping bolts 57. The outside periphery of the heavy portion of the wheel 55 is formed with a cylindrical periphery 58 adapted to be engaged by a plurality of V belts 59 which are in turn driven by a suitably grooved V belt pulley 60 mounted on the shaft 61 of an electric motor 62, adjustably supported on a bracket extension 63 on the frame 12.

Figures 6, 7:
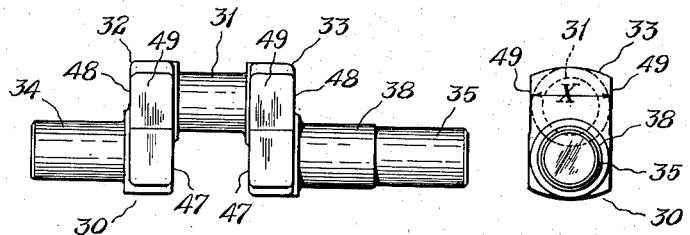
Fig. 6 is a detached plan or side view of a crank shaft comprising one of the essential elements of this invention.
Fig. 7 is an end view of the crank shaft illustrated in Fig. 6.
Figure 8:
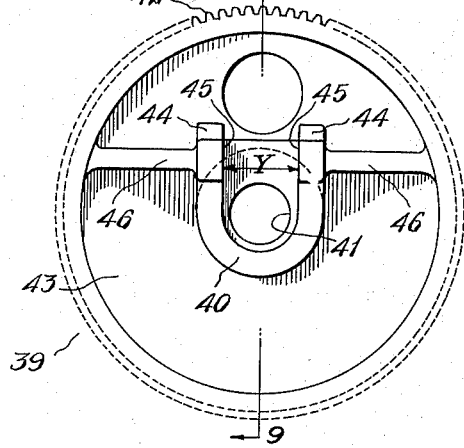
Fig. 8 is a detached face view of a drive member comprising an essential element of this invention.
Figure 9:
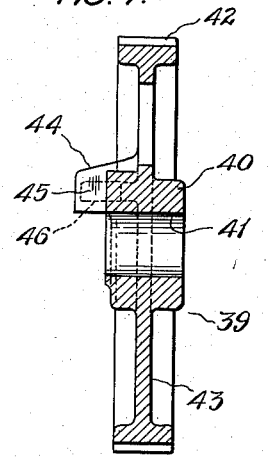
Fig. 9 is a vertical axial section thru the drive member illustrated in Fig. 8, this view being taken on the plane indicated by line 9, 9 in Fig. 8.
Figures 10, 11:
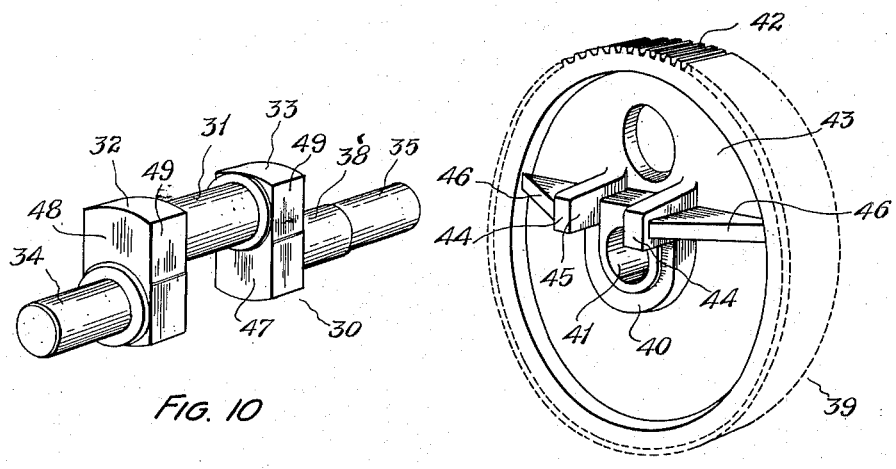
Fig. 10 is a detached perspective view of the crank shaft illustrated in Figures 6 and 7.
Fig. 11 is a detached perspective view of the drive member illustrated in Figures 8 and 9.

In machining the crank shaft 30 and the drive member 39, the transverse width of the crank arm between the side surfaces 49, 49 indicated by the dimension X in Figure 7 is made slightly larger than the width of the space on the drive member between the faces 45, 45 (between which the crank arm is positioned) indicated by the dimension Y in Fig. 8.

The increment in width of the crank arm over the width of the space in the drive member is so selected that the two parts will engage each other in a tight force fit.

This force fit between the extensive flat surfaces 45, 45 and 49, 49 together with the force fit of the bore 41 on the shaft portion 38 insures, in effect, a substantially integral driving connection which is entirely free of any backlash and in which the engaging thrust-transmitting areas are accurately alined. It will also be evident that the thrust-transmitting areas are relatively very great compared with the areas of keys heretofore used in drives of this kind. It will also be evident that these thrust-transmitting areas are located radially at a much greater distance from the axis of the journals than the usual keys and that, accordingly, the intensity of the stress on the thrust-transmitting areas is considerably less than the stress imposed on keys and keyways, for identical power transmission.

It will be apparent from the drawings that the crank driving surfaces 45, 45 overlap, at least in part, the sides faces 49, 49 of the crank arms.

It will accordingly be evident that the driving stress is applied by the driving member directly to the side of the crank arm at a point as closely adjacent to the crank pin as is possible and that essentially no torsional stress is transmitted thru any portion of the shaft of the crank shaft.

It will also be clear that this driving stress is applied to the sides of the crank arm in planes which are disposed on opposite sides of the plane containing the axes of the crank pin and the journals.

In some embodiments of this invention in which the conditions are extremely severe or in which it is desired to reduce the weight or dimensions of the interengaging parts, it has been found desirable to weld the ears 44, 44 to the surfaces 49, 49 preferably, by an arc welding process.

As will appear from Figures 2, 6, 9, 10, and 11, the extent of the surfaces 45, 45 and the adjacent portions of the ears 44, 44 are smaller in area than the surfaces 49, 49 which they contact. It will also appear that the surfaces 49, 49 extend beyond the periphery of the ears 44 on three sides and that the periphery forms a right angular valley between the edges of the ears 44 and the surfaces 49.

In the severe cases referred to, a fillet weld, indicated at w in Figures 2 and 4, is applied in the valley to integrally weld together the periphery of the ears 44 and the adjacent portions of the surfaces 49. This weld for all practical purposes forms a unitary connection between the crank arm 30 and the driving member 39.

In the event that either crank shaft or driving member require repairs or replacements as a result of a failure or wear, the fillet welding may be readily removed by usual grinding or chiselling tools, which form a part of the regular equipment of modern shops, after which the parts can readily be separated, either manually or in suitable presses. The feature of this invention just described provides all the advantages of an integral connection between drive member and crank shaft, without the difficulties and expense incident to machining of a combined drive gear and crank shaft, and also affords the opportunity of replacing either drive member or crank shaft separately.

It will be noted that both arms of the crank shaft hereinbefore described are preferably machined to the same width between the sides faces 49, 49. This provision is preferred to make it possible to apply the driving member to either arm depending upon the requirements of the installation.

In some cases also it is desirable to apply two driving members to a double crank shaft. By way of illustration, such an embodiment is illustrated in Fig. 5, in which a frame 70 of suitable width is provided. Mounted on this frame on a king pin in a manner similar to that shown in Fig. 1 is a lever or shear arm 25. As in the previously described construction, the rear end of this shear arm is oscillatorily connected by means of a wrist pin 28 with one end of a connecting rod 29, the opposite end of the rod having a pivotable connection with the crank pin 71 of the double crank shaft indicated in its entirety at 72. The crank shaft 72 is formed with alined and substantially parallel crank arms 73 and 74 and cylindrical terminal extensions or journals 75 and 76. The axis of the crank pin 71 is parallel to and eccentrically disposed with respect to the journals 75 and 76. The journals 75 and 76 are mounted in bearings 77 and 78 in the main frame 70.

The journals 75 and 76 are each spaced from the adjacent crank arms 73 and 74 and interposed between the journals and the adjacent crank arm are preferably cylindrical crank shaft portions 79 and 80 respectively, each adapted to support driving members 81, 81 to be presently described.

The driving members 81, 81 each consist of a spur gear provided with a hub which is in turn formed with a bore 82 machined for a tight force fit on the cylindrical portions 79 and 80. Each driving member 81 is also formed with a pair of ears 83 similar in conformation and location to the ears 44 previously described. These ears are formed with juxtaposed surfaces similar to the surfaces 45 and are adapted to engage between them, in force fit relation, portions of the side faces 84, 84 of the crank arms 73 and 74 at areas straddling extensions of the crank pin axis. In applications where extremely severe conditions are encountered, a fillet weld $w$ is preferably applied at the point of engagement between the ears 83 and the faces 84 whereby the periphery of the ears 83 is integrally welded to the adjacent portion of the faces 84.

The driving members 81 are each formed with peripheral teeth 85 engaged by a pair of spaced alined pinions 86, 86 provided on a shaft 87 mounted in bearings 88 in the frame 70. This shaft 87 may be driven in any convenient manner, as for instance, by means of a flywheel pulley as in the previously described construction.

While this invention is described in an embodiment in which the crank shaft is mounted in two bearings and is provided with two crank arms interposed between the two bearings, this invention can also be embodied in other relative arrangements of crank arms, crank pins, drive member and bearings. This invention may, for instance, be adapted to a crank shaft having a single crank arm with all bearing means extending in one axial direction from the crank arm and the crank pin overhanging and extending in the other axial direction from the crank arm.

It will also be evident that instead of a unitary spur gear, the drive member may be any other type of drive element or combination of drive elements such for instance as a hub element which is periodically engaged by means of a clutch element, with a continuously rotating flywheel.

It will be apparent to those skilled in the art that I have accomplished the principal objects of my invention, and it will also be apparent that the embodiment herein described may be variously changed and modified without departing from the spirit of the invention, and that the invention is capable of uses and has advantages not herein specifically described; hence it will be appreciated that the herein disclosed embodiment is illustrative only and that my invention is not limited thereto.

Certain features disclosed in this application and not claimed herein are claimed in my copending application Serial No. 768,657 filed August 14, 1947.

What I claim is:

1. A drive mechanism for a crank shaft comprising a crank arm and a shaft portion extending in one axial direction from the arm and a crank pin parallel to the shaft portion and extending in the opposite axial direction from the arm, in combination with a rotatable drive member formed with a bore mounted on the shaft portion and with a pair of ears having bearing surfaces extending axially toward the crank arm and overlapping the crank arm at least in part and spaced apart a distance substantially equal to the axially transverse width of the crank arm between the side faces thereof and snugly engaging said side faces of the crank arm.

2. A drive mechanism for a crank shaft comprising a crank arm, a shaft portion, and a crank pin, the shaft portion and crank pin being parallel to each other and extending in axially opposite directions from the crank arm and the crank arm being formed with a pair of spaced opposite side faces, in combination with a rotatable drive member mounted on the shaft portion adjacent to the crank arm and formed with a pair of opposed spaced shoulders projecting axially from the drive member toward the crank arm and overlapping the crank arm at least in part and snugly engaging said side faces of the crank arm in spaced planes on opposite sides of the plane common to the axes of the crank pin and shaft portion.

3. A drive mechanism for a crank shaft comprising a crank arm, a shaft portion and a crank pin, the shaft portion and crank pin being parallel to each other and extending in axially opposite directions from the crank arm and the crank arm being formed with opposite flat side faces substantially parallel to the axis of the shaft portion, in combination with a rotatable drive member concentrically mounted on the shaft portion adjacent to the crank arm and formed with a pair of spaced opposed shoulders projecting axially from the drive member and formed with flat surfaces respectively parallel to and snugly engaging the opposite side faces of the crank arm over extensive areas of said faces and surfaces.

4. A drive mechanism for a crank shaft comprising a crank arm, a shaft portion and a crank pin, the shaft portion and crank pin being parallel to each other and extending in axially opposite directions from the crank arm, the crank arm being formed with side faces parallel to and disposed in planes on opposite sides of the axis of the crank pin, in combination with a rotatable drive member concentrically mounted on the shaft portion adjacent to the crank arm and formed with a pair of spaced opposed shoulders projecting axially from the drive member and formed with extensive bearing surfaces parallel to and engaging the side faces of the crank arm with a press fit over extensive areas.

5. A drive mechanism for a crank shaft comprising a crank arm, a shaft portion and a crank pin, the shaft portion and crank pin being parallel to each other and extending in axially opposite directions from the crank arm, and the crank arm being formed with side faces substantially parallel to each other and to the axis of the shaft portion and defining the transverse width of the crank arm, in combination with a rotatable drive member concentrically mounted on the shaft portion adjacent to the crank arm and formed with a pair of shoulders having an intervening space extending axially into the radial plane of the crank arm, said shoulders having parallel bearing surfaces spaced apart a distance substantially equal to the transverse width of the crank arm and engaging the parallel side faces of the crank arm with a snug mechanical fit over extensive areas.

6. A drive mechanism for a crank shaft comprising a crank arm, a shaft portion and a crank pin, the shaft portion and crank pin being parallel to each other and extending in axially opposite directions from the crank arm, and the crank arm being formed with opposite side faces, in combination with a rotatable drive member concentrically mounted on the shaft portion adjacent to the crank arm and formed with a pair of spaced ears projecting axially from the drive member and formed with extensive bearing surfaces respectively parallel to and snugly engaging the opposite side faces of the crank arm, the area of said surfaces being less than the area of the side faces whereby portions of the surfaces extend beyond the edges of the ears, and a weld integrally connecting the edges of the ears with the side faces.

7. Crank drive mechanism including in combination a supporting frame, a pair of axially alined bearings formed in the frame, a crank shaft comprising a pair of alined journals rotatably mounted in the bearings, a pair of alined crank arms interposed between the journals and a crank pin interposed between the crank arms, each of the crank arms having side faces defining its transverse width, and a rotatable drive member interposed between one of said bearings and a crank arm and coaxially mounted on the shaft with reference to the journals, said drive member being formed with a pair of ears radially spaced from the axis of the journals and projecting axially toward and overlapping at least a portion of the side faces of one of the crank arms, said overlapping ears being formed with surfaces alined with the adjacent side faces and spaced apart a distance substantially equal to said transverse width, whereby the ears engage the side faces of the crank arm in backlash-free driving engagement.

8. Crank drive mechanism including in combination a supporting frame, a pair of axially alined bearings formed in the frame, a crank shaft comprising a pair of alined crank arms, one of the arms being formed with parallel side faces defining the transverse width of the crank arm, a pair of journals, a shaft portion disposed intermediate one of the journals and the said one crank arm, a crank pin located between the crank arms and parallel to and radially offset with respect to the axis of the journals, the journals being rotatably mounted in the bearings, a gear mounted on said shaft portion coaxially with the journals and provided with a pair of parallel opposed extensive surfaces spaced from the axis of the journals a radial distance substantially equal to the radial offset of the crank pin and spaced apart a distance adapted, when assembled with said side faces of the crank arm, to embrace and form a force fit therewith, whereby the said bearing surfaces engage the side faces of the crank arm adjacent the crank pin on diametrically opposite sides thereof and over extensive areas in planes disposed on opposite sides of the plane containing the axes of the crank pin and journals.

LAD L. HERCIK.

REFERENCES CITED

The following references are of record in the file of this patent:

UNITED STATES PATENTS

| Number | Name | Date |
|---|---|---|
| 186,285 | Wells | Jan. 16, 1877 |
| 588,995 | Johnson | Aug. 31, 1897 |
| 1,186,547 | Chapman | June 13, 1916 |